United States Patent [19]

Siepmann

[11] 3,975,810

[45] Aug. 24, 1976

[54] VALVE HOUSING AND METHOD OF MAKING THE SAME

[75] Inventor: Walter Siepmann, Belecke, Germany

[73] Assignee: Eugen Vogt, Birrwill, Switzerland

[22] Filed: June 25, 1975

[21] Appl. No.: 590,136

Related U.S. Application Data

[62] Division of Ser. No. 477,493, June, 1974, Pat. No. 3,913,887.

[30] Foreign Application Priority Data

June 22, 1973 Germany............................ 2331748

[52] U.S. Cl.............................. 29/157.1 R; 29/463; 29/445; 228/104; 251/367
[51] Int. Cl.².................... B23P 15/00; B23P 13/00; F16K 27/10
[58] Field of Search................ 29/157.1 R, 463, 445; 228/182, 174, 155, 104; 251/367, 366

[56] References Cited
UNITED STATES PATENTS

| | | | |
|---|---|---|---|
| 1,586,691 | 6/1926 | Murray, Jr. | 29/157.1 R |
| 2,363,943 | 11/1944 | Carlson | 29/157.1 R |
| 2,869,221 | 1/1959 | Siepmann | 29/157.1 R |
| 2,989,976 | 6/1961 | Kinderman et al. | 29/157.1 R |
| 3,354,793 | 11/1967 | Meier et al. | 228/182 |
| 3,756,560 | 9/1973 | Siepmann | 251/367 |

*Primary Examiner*—C.W. Lanham
*Assistant Examiner*—Dan C. Crane
*Attorney, Agent, or Firm*—Michael J. Striker

[57] ABSTRACT

A valve housing is composed of a pair of shell sections each of which has an open side surrounded by an edge face, and a semi-circular rib located within the open side and having a face slightly downwardly recessed from the associated edge face. The shell sections are placed together so that their edge faces abut, and these edge faces are welded to one another. The ribs are semi-circular in mutually opposite directions and thus form a circumferentially complete annular portion. Opposite this portion the housing is provided with an opening having a larger diameter than the portion, and after the shell sections have been welded together a material-removing tool is inserted through this opening and forms on the tubular portion a circumferentially complete annular welding face which is in part of stepped configuration. A seat-forming member which is annular and which is of similarly stepped configuration is then inserted through the opening and positioned on the annular welding face, and thereupon welded to the same by means of an electron beam which is admitted through the opening.

1 Claim, 9 Drawing Figures

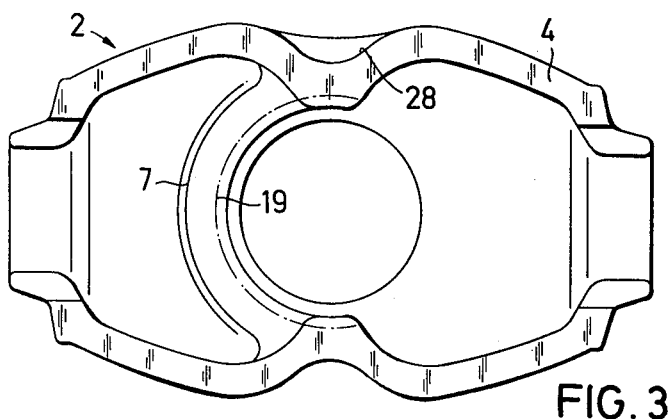
FIG. 3
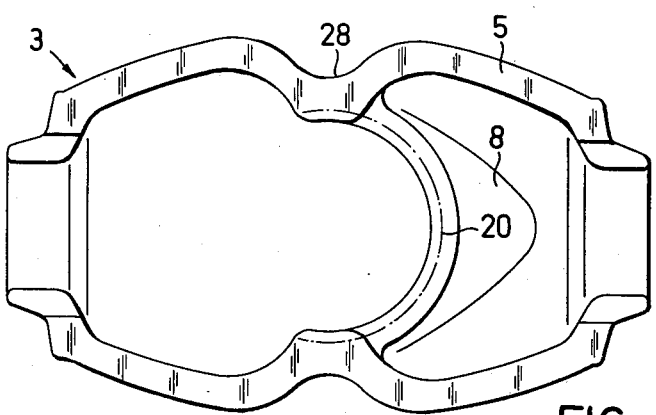
FIG. 4
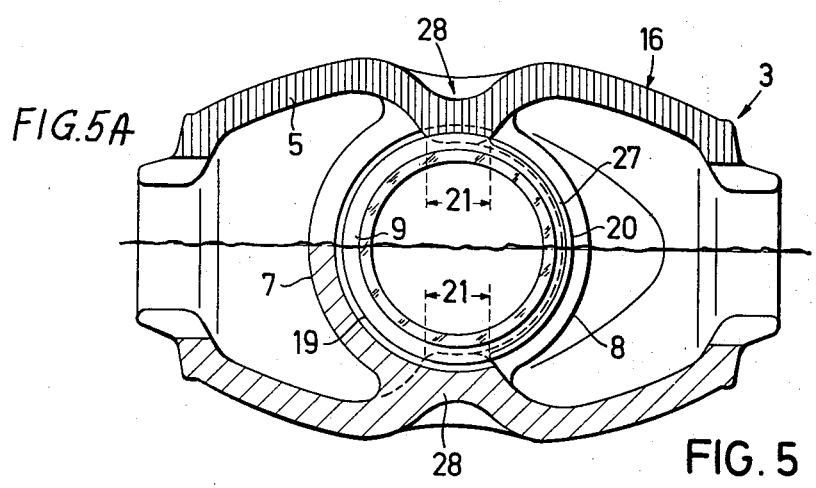
FIG. 5A
FIG. 5

VALVE HOUSING AND METHOD OF MAKING THE SAME

CROSS-REFERENCE TO RELATED APPLICATION

The present application is a divisional application of the application Ser. No. 477,493, filed June 7, 1974, now U.S. Pat. No. 3,913,887.

BACKGROUND OF THE INVENTION

The present invention is generally directed to valve housings for gate valves and the like, and more particularly to a novel valve housing construction and to a method of making the same.

Valve housings of the general type with which the present invention is concerned, and a method of effecting welding of such valve housings by means of directing an electron beam against the parts to be welded, are already disclosed in my prior U.S. Pat. No. 3,473,785 which is incorporated in its entirety by reference.

In that patent I have disclosed how I can make a valve housing for a gate valve or the like by utilizing two forged shell sections which are placed into abutting engagement of their edge faces, thus forming a valve housing. The edge faces are then welded together by an electron beam, and in the interior of the valve housing there is provided a support composed of portions provided on the respective shell sections and to which a seat-forming member is also welded by an electron beam admitted from the exterior of the valve housing.

The construction disclosed in my aforementioned U.S. patent is advantageous for the reasons outlined therein; however, it has been found that further improvements are desirable for reasons of ease of manufacture, and for another reason which is even more important. In particular, it has been found that licensing authorities which must pass on the acceptability of valve housings of such type frequently require that the welded seam be inspected for the quality of the weld by subjecting the housing to an X-ray examination. The construction disclosed in my aforementioned U.S. patent cannot meet these requirements, at least not fully, because in the regions where the edge faces abut there were certain overlaps which existed with portions of the shell sections to which the annular seatforming member was welded, and this overlap made a precise control of the weld quality by X-raying impossible.

SUMMARY OF THE INVENTION

It is therefore a general object of the present invention to provide an improvement over the prior art.

More particularly, it is an object of the present invention to provide an improved valve housing of the type in question, and an improved method of making this valve housing, which meet the requirements outlined above, and in particular make it possible to readily and reliably examine by means of X-rays the welded seam which units the shell sections of the housing.

Another object of the invention is to assure that, while the aforementioned advantages are obtained, the possibility of welding the ring-shaped valve-seat carrying member by means of electron beams from the exterior of the housing, is preserved.

In keeping with the above objects, and with others which will become apparent hereafter, one feature of the invention resides in a method of making a valve housing for gate valves and the like. The method comprises the steps of providing a pair of shell sections which are forgings and which each have an open side bounded by an edge face, and a semi-circular rib which is located within the open side and which has a face slightly downwardly recessed from the associated edge face. The ribs are semi-circular in mutually opposite directions and one of the shell sections has in its wall opposite the open side thereof an opening of a diameter greater than the diameter defined by the ribs together. The shell sections are then placed together so that the open sides are juxtaposed and their faces abut one another, and they are welded together at the edge faces in order to form a valve housing. Thereupon, a material-removing tool —such as a milling cutter or the like— is inserted through the opening and is used to form respective at least semi-cylindrical welding faces on the respective ribs, which faces together define a circumferentially complete annular face of in part Z-shaped stepped configuration. An annular seat-forming member of similarly stepped configuration is thereupon inserted through the opening and is positioned on the annular welding face, and then the valve-seat forming member is welded to the annular welding face by means of an electron beam which is directed into the interior of the housing through the opening thereof.

It is clear that during the initial operating step of making the housing from the shell sections, only the two shell sections are welded together at their juxtaposed edge faces which have previously been machined —ground, or otherwise finished— so as to be completely planar. The welding of the shell sections to one another can be effected by admitting an electron beam through one of the axially spaced inlet and outlet openings which are provided in addition to the aforementioned opening, and during relative movement of electron beam and housing the beam can reliably contact all portions of the housing at the interior thereof, that is at the interface between the juxtaposed edge faces, so that a reliable weld is obtained. Since the faces of the ribs are somewhat recessed from the associated edge faces of the respective shell section, the beam can pass by the ribs and the latter do not interfere with it, so that a welded seam is obtained at the edge faces of the two shell sections which is reliable throughout.

The subsequent step of operating upon the thus created housing by means of the aforementioned material-removing tool, assures in the first place that the seam between the welding faces on the ribs and the circumferential surfaces of the subsequently to be introduced seat-forming member of annular configuration can be reached when later another electron beam is introduced through the opening of the housing in parallelism with the central axis of this opening, which may also be considered a transverse opening as opposed to the axially spaced inlet and outlet openings for fluid. In so doing it is important that when the material-removing operation is carried out, a Z-shaped stepped circumferentially complete cylindrical annular welding surface be produced, which at its diametrically opposite regions of intersection with the edge faces of the shell sections which bound the shell sections in longitudinal direction of the latter, has approximately double the height due to overlapping of the ends of the semi-circular segments. These segments, which are each located to one half above and to one half below the plane of the interface of the edge faces of the two shell sections, form a stepped annular welding surface of which the double-height diametrically oppositely located portions extend substantially normal to the welded-together edge faces of the shell sections in the region where they intersect with the same. This assures a clean and reliably tight weld since overlapping welding regions —of the welds used for welding the shell sections together, and subsequently of the weld used for welding the valve-seat forming member to the annular welding surface— is avoided.

Finally, the third essential operation is to introduce the one-piece annular valve-seat forming member, which is also provided with substantially Z-shaped stepped configuration, through the transverse opening into the interior of the housing, and to place it onto the welding surface, whereupon an electron beam is introduced through the transverse opening in parallelism with the central axis of the same and used to weld the valve-seat forming member to the annular welding surface. The approximately Z-shaped circumferential welding face on the valve-seat forming member provides for a reliable tight welding connection which bridges the plane of separation of the shell sections with strip-shaped portions at diametrically opposite locations.

The advantages of the housing according to the present invention are to be seen in the fact that it is not only possible to produce reliable welds at the interface of the two edge faces of the shell sections, but also that these welds can be readily examined by X-rays, and that the formation of the weld and the subsequent X-raying are not influenced by the fact that the annular valve-seat forming member is provided and is also welded in place.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a bottom-plan view of the upper shell section of the housing in FIG. 1, after the edge faces have been machined to be planar;

FIG. 4 is a view similar to FIG. 3, but in a top-plan view of the lower shell section after the edge faces have been machined to be planar;

FIG. 5 is a horizontal section taken on line C–D of FIG. 1;

FIG. 5a is a section similar to FIG. 5, but taken on line C—C', D—D' of FIG. 1;

DESCRIPTION OF THE PREFERRED EMBODIMENTS

Figure 1:
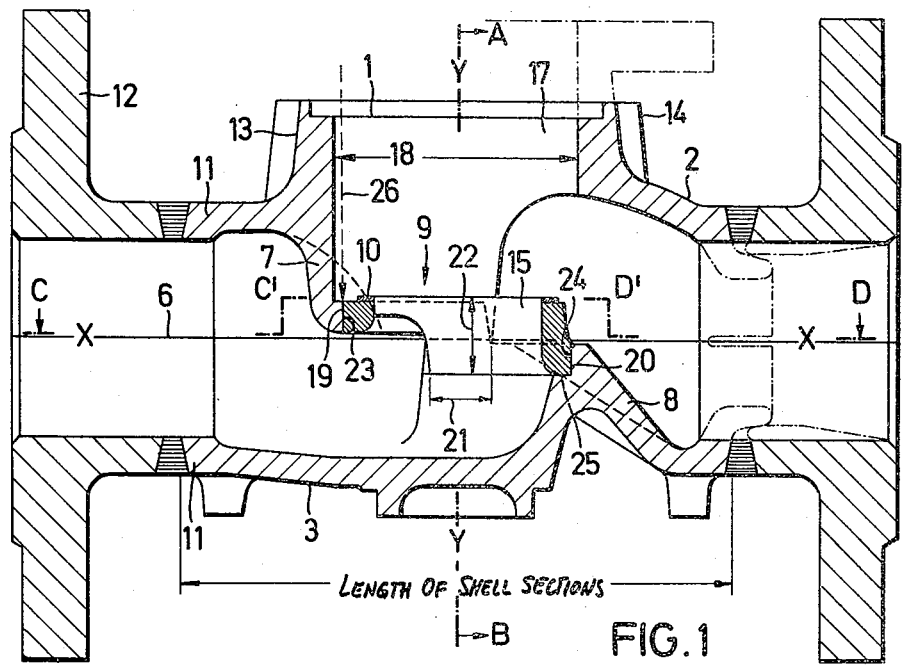
FIG. 1 is a vertical longitudinal section through a housing according to the present invention.
Figure 2:
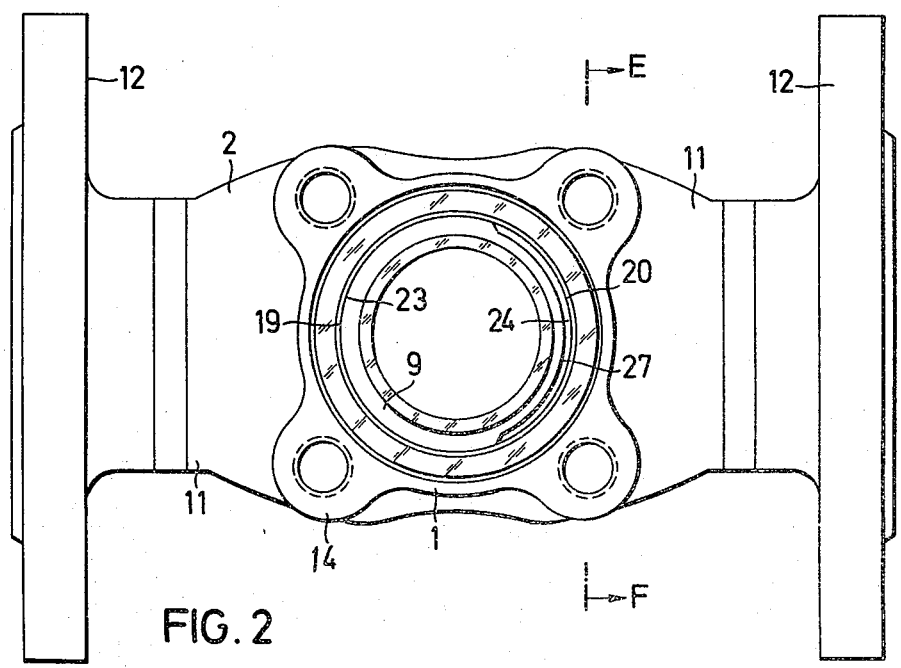
FIG. 2 is a top-plan view of FIG. 1.

Referring now to the drawing in detail it will be seen that in FIG. 1 a vertical section is shown of the finished housing. The latter is composed of two forged shell sections 2 and 3, namely the upper shell section 2 and the lower shell section 3. Both of these increase in diameter from their opposite ends towards the center, as is most clearly evident from FIG. 2. The upper shell section 2 is provided with a transverse opening 1, and FIG. 1 shows that the housing is provided at its opposite axial ends with inlet and outlet openings for fluid.

The shell sections 2 and 3 are bounded by edge faces which are most clearly shown in FIGS. 3 and 4 and which are identified with reference numerals 4 (for the shell section 2) and 5 (for the shell section 3), respectively. These edge faces 4 and 5 are placed into abutment with one another after they are first machined to be perfectly planar and extend in parallelism with the longitudinal center plane x—x (see FIG. 1); the welding is effected by means of electron beam welding of the type and in the manner disclosed in my aforementioned U.S. patent.

The shell section 2 is formed in its interior with an arcuate semi-circular rib 7 which is concentric to the axis y—y along which the valve spindle (not shown) will later move with respect to the transverse opening 17. The shell section 3 is formed with a similar transverse rib 8, and the two ribs are semi-circular in mutually opposite directions (compare FIGS. 3 and 4). The height of the ribs 7 and 8 is such that their free faces are located slightly recessed from the respective edge faces 4 and 5, that is they must be recessed from the center plane x—x. As onepiece annular valve-seat forming member 9 is accommodated between the ribs 7 and 8 and the lateral portions of the shell sections 2 and 3, and is welded in place in the manner which will be discussed subsequently. The member 9 may be provided with a ring-shaped seat 10 that is applied to it by cold-rolling or in any other suitable manner. The members 9 and 10 are fully or almost fully prepared —machined, finished or the like— before being welded in place.

At the opposite end portions 11 of the shell sections 2 and 3, which end portions 11 surround and define the inlet and outlet openings for the housing, flanges 12 may be welded to the housing for connection of the housing to corresponding flanges of pipes or the like. However, it is entirely possible to weld the end portions 11 directly to respective pipes without requiring the use of flanges, and again it is possible to use flanges which can be connected to the end portions 11 by means of cooperating screw threads provided on the flanges and on the end portions. Similarly, the tubular portion of the shell section 2, wherein the opening 17 is formed, may be provided without a flange as shown, or with a flange as diagrammatically suggested in FIG. 1 by the broken line. If no flange is provided, then —as shown in FIG. 1— the portion will be provided with circumferentially spaced projections 14 in which bores (not shown) may be formed for receiving screws or the like.

The shell sections 2 and 3 are relatively flat in their respective interior, and are wider at the center than they are at the end portions 11, as already pointed out earlier. This means that the height of the flow passage through the housing subsequent to the valve opening 15 is equal or at least not substantially greater than the inner diameter of the openings bounded by the end portions 11. The width of the shell sections 2 and 3 is approximately double the inner diameter in the region of the end portions 11. The edge faces 4, 5 of substantially uniform width over the entire axial length of the respective shell sections, as a comparison of FIGS. 3–5 will readily establish.

When the edge faces 4, 5 have been finished so as to be absolutely plane with respect to the center plane x—x, the shell sections 2 and 3 are placed together so that the edge faces 4, 5 abut in the plane x—x, whereupon the edge faces 4, 5 are welded together by means of the aforementioned electron beam, or by means of more than one of such beams, which are admitted through the inlet and outlet openings at the opposite axial ends of the housing. The welding takes place during a relative movement of electron beam or beams and housing. In the regions of increased wall thickness of the housing, the relative movement between housing and electron beam or beams is either decreased, or the beam energy is increased, in order to obtain a high-quality weld. Since the edge faces 4, 5 are only in abutting engagement, but are not blocked either at the interior or at the exterior of the housing, the electron beam can also be applied from the exterior of the housing and can pass between the edge faces 4, 5 to the interior of the housing, thus forming a weld extending over substantially the entire surface area at the interface between these edge faces 4, 5, from the outer to the inner edges 6 thereof. This seam can subsequently be X-rayed to determine its quality and tightness, in the manner which will be discussed later.

When the shell sections 2, 3 have been welded together in the manner just discussed, a material-removing tool is inserted into its interior through the transverse opening 17. If the opening 17 has not been previously formed, then the housing is placed into an appropriate tool machine and the latter is used to form the opening 17 in the tubular portion 13. The diameter 18 of the opening 17 must be greater than the outer diameter of the annular valve-seat forming member 9 which is to be inserted through it. A slightly smaller drill or milling cutter is used thereafter, being inserted through the opening 17, to form first an at least semi-cylindrical welding face 19 on the rib 7, and thereupon to form a similar semi-cylindrical stepped groove 20 in the rib 8. The end portions of the face 19 and the groove 20 overlap in the region 21 at diametrically opposite portions at the middle of the housing and intersect the welded-together edge faces 4, 5 in these short sections 21. The surface 19 and the groove 20 together thus form an annular welding surface which is circumferentially complete and which forms a substantially Z-shaped stepped configuration at diametrically opposite sides of the housing, and in the region of the sections 21 as double the height 22.

Figure 6:
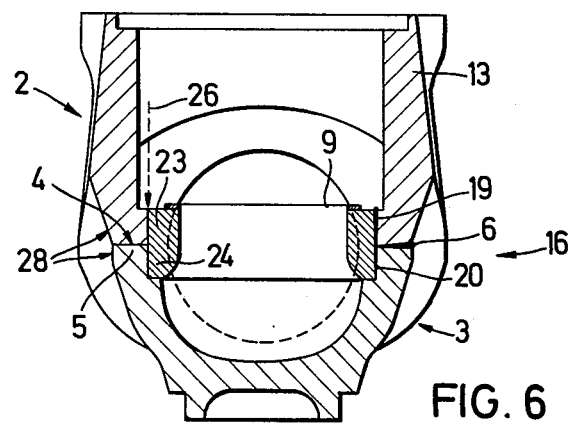
FIG. 6 is a vertical section taken on line A–B of FIG. 1.
Figure 7:
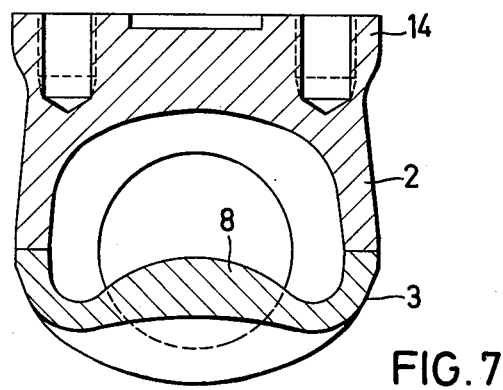
FIG. 7 is a vertical section taken on line E–F of FIG. 2.

The ring-shaped valve-seat forming member 9 is already shown as inserted and welded in place in the housing in FIGS. 1, 5 and 6. Its configuration is shown in the perspective view of FIG. 8 and it will be seen to have an approximately Z-shaped configuration, being formed with cylindrical welding faces 23 and 24. In the diametrically opposite regions 21a the two sectors of the faces 23, 24 overlap so as to form a welding face region of twice the height. The face 23 is welded to the surface 19 of the rib 17, which has a corresponding circumferential length, whereas the face 24 is welded to the groove 20 which also has a corresponding circumferential length. The faces 23, 24 have the same diameter and thus together form an essentially cylindrical surface. The depth to which the member 9 can be inserted is determined by the abutment of the lower end of the member 9 with the shoulder 25 of the groove 20. Thereupon, an electron beam 26 is admitted (see FIGS. 1 and 6) in parallelism with the central axis of the opening 17, which is also the axis y—y of the spindle to be inserted later. Relatively circular movement is then effected between electron beam 26 and housing, to obtain a welding of the member 9 in place.

The two welds which are thus obtained, that is the first weld which connects the shell sections 2 and 3 and the second weld which holds the member 9 in place, in effect extend normal to one another and contact one another only within the diametrically opposite housing portion 21. This assures an absolutely tight transition between the welds, and each welded seam can be controlled by X-raying without having to influence or damage the other welded seam.

Figure 8:
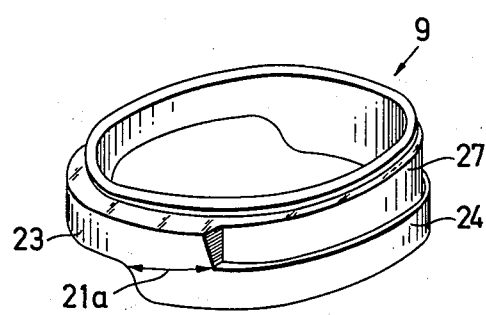
FIG. 8 is a perspective view illustrating the annular valve-seat forming member used in the illustrated embodiment.

FIGS. 1 and 8 show also that the upper half of the member 9 forms a circumferentially complete annular portion the circumference of which is radially inwardly offset above the lower surface 26 which is of Z-shaped stepped configuration and has the outline of an arcuate segment. The recessing is over most of the circumference of the upper half of the member 9, so that a recessed surface 27 is obtained which makes it possible for the electron beam to enter without deflection into the welding region between the surfaces 20 and 24, that is where the weld is to be established which holds the member 9 in place.

The shell sections 2 and 3 are provided midway intermediate the opposite ends 11 with inwardly bent or deformed portions 28 which are located diametrically opposite one another. The purpose of these portions is to deflect the edge faces 4, 5 in these regions far enough inwardly so that they will be intersected by the welding faces 19, 20, thereby assuring that even in the region of these inward depressions the edge faces 4, 5 have essentially the same width as elsewhere.

To control the quality of the welded seams which have been produced, the shell sections 4, 5 are first welded together with the aforementioned electron beam or beams, and thereupon the welded seams produced are X-rayed by placing X-ray film against the housing at the exterior, keeping in mind the depressions formed at the regions 28, and then X-rays are directed outwardly from the interior of the housing through the wall thereof, so that the X-rays travel past the free edges of the rib 7, 8 into and through the welded seams where the edge faces 4, 5 are welded together. The fact that the free edges of the ribs 7, 8 are recessed from the plane x—x is of great importance not only because it prevents deflection of the electron beam which effects welding of the edge faces 4, 5 together, but also it prevents deflection of the X-ray radiation and thus permits simple and reliable X-raying of the welded seam. Subsequently, the further operations are carried out which culminate in the welding-in-place of the member 9. The welds holding the member 9 in place, and the welds connecting the edge faces 4, 5 together, contact but do not overlap one another, thus making it possible to obtain reliable X-ray pictures by means of which the quality of the welds can be readily checked.

It will be understood that each of the elements described above, or two or more together, may also find a useful application in other types of applications differing from the types described above.

While the invention has been illustrated and described as embodied in the making of a valve housing for gate valves or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A method of making a valve housing comprising the steps of providing a pair of shell sections each having an open side bounded by a planar edge face, and a semi-circular rib integral with the respective shell section, located within said open side and having an end face substantially parallel to the respective edge face, and displaced in a direction normal to the associated edge face from the latter, the ribs being semi-circular in mutual opposite directions, and one of said shell sections having in its wall opposite said open side an opening having a central axis substantially normal to the edge face thereof and a diameter greater than the diameter defined by said ribs together; grinding said edge faces of said shell sections; placing said shell sections together with said open sides juxtaposed and said ground edge faces abutting against each other in a plane, with said end faces of said ribs located to opposite sides of said plane; welding said shell sections together at said edge faces by a weld seam; examining the thus-formed weld seam over the whole length thereof by x-rays; inserting a material removing tool through said opening and forming with it respective at least semi-cylindrical welding faces on the respective ribs, which together define a circumferentially annular face of in part Z-shaped stepped configuration; inserting through said opening an annular valve seat forming member of similarly substantially Z-shaped configuration and positioning it on said annular face; and welding said annular valve seat forming member to said annular face by means of an electron beam passing through said opening parallel to the central axis thereof.

* * * * *